United States Patent [19]

Stickels et al.

[11] 4,023,988
[45] May 17, 1977

[54] HEAT TREATMENT FOR BALL BEARING STEEL TO IMPROVE RESISTANCE TO ROLLING CONTACT FATIGUE

[75] Inventors: Charles A. Stickels, Ann Arbor; Anthony T. Anderson, Romulus; Adam M. Janotik, Grosse Ile, all of Mich.

[73] Assignee: Ford Motor Company, Dearborn, Mich.

[22] Filed: Feb. 2, 1976

[21] Appl. No.: 654,673

[52] U.S. Cl. .............................. 148/12.4; 148/36; 148/144

[51] Int. Cl.² .......................................... C21D 9/40

[58] Field of Search ............... 148/12.4, 12 F, 144, 148/36

[56] References Cited

UNITED STATES PATENTS 3,595,711  7/1971  Faunce et al. ................... 148/144
3,895,972  7/1975  Woodilla, Jr. et al. ........... 148/144

*Primary Examiner*—W. Stallard
*Attorney, Agent, or Firm*—Joseph W. Malleck; Keith L. Zerschling

[57] ABSTRACT

A method (and resulting product) for preparing bearing components is disclosed. Utilizing a low alloy steel shape containing carbon in the range of 0.6–1.5% and containing alloying ingredients in the range of 1–2% selected from the group consisting of Cr, Mn, Ni, Cu and Mo (and preferably the ingredients of SAE 52100 steel), the steel shape is subjected sequentially to a spheroidizing-anneal heat treatment, a rough forming treatment, and a hardening-heat treatment. Immediately prior to the hardening-heat treatment, a fine bainitic or preferably pearlitic microstructure is established having relatively thin carbide films at prior austenite grain boundaries. Austenitizing of said pearlitic or bainitic microstructure is carried out at a temperature in the range of 1625°–1675° F for a period of time preferably between 15 seconds and one-half hour, but operationally for a period of time as short as 5 seconds and as long as 1 hour.

9 Claims, 3 Drawing Figures

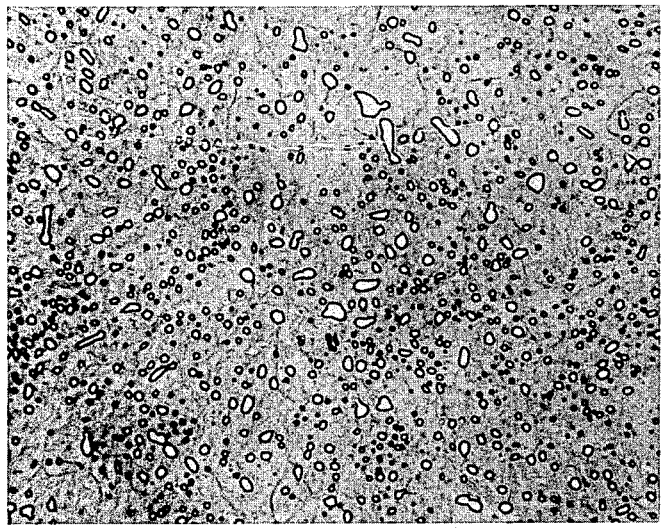

FIG. 2.

Primary carbides in 52100 steel. Spheroidal carbides in ferrite prior to the hardening heat treatment. A microstructure typical of commercially processed bearing steel. Picral etch.
1500X Primary carbides in 52100 steel. Pearlitic microstructure prior to the hardening heat treatment. This microstructure is typical of that produced by the process taught in this patent. Picral etch. 1500X

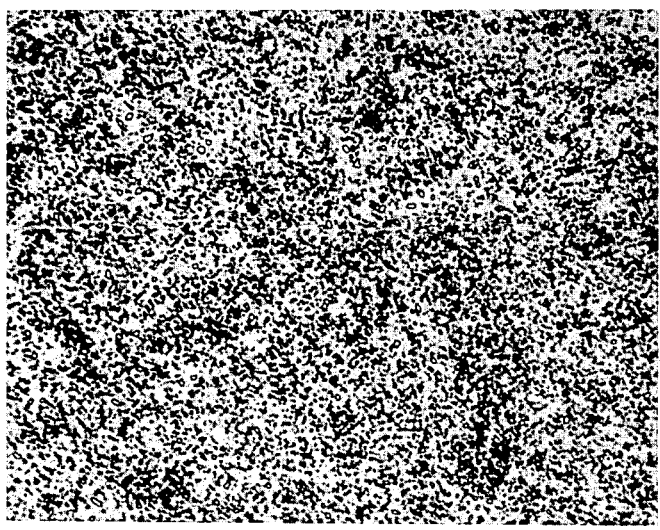

FIG. 3.

HEAT TREATMENT FOR BALL BEARING STEEL TO IMPROVE RESISTANCE TO ROLLING CONTACT FATIGUE

SUMMARY OF THE INVENTION

A primary object of this invention is to improve rolling contact fatigue life for metallic bearing components, particularly chromium steel components, without costly deviations from present commercial practices.

Particular features pursuant to the above object comprise modification of the conventional hardening-heat treatment steps to include (a) prior heating to a temperature level to achieve essentially complete carbide solution and cooling rapidly to a plateau of 800°–1250° F, holding at that temperature for a time sufficient to achieve complete transformation of austenite to pearlite or bainite and (b) austenitizing for hardening at a temperature in excess of the austenizing temperature required to achieve peak hardening for a given bearing metal and preferably about 100° F higher than in conventional austenitizing practice for a given bearing component.

It is another object of this invention to obtain a synergistic improvement in the B50 fatigue life for metallic bearing components by increasing the threshold fineness of the metal microstructure and by increasing the amount of retained austenite. It is an additional object to control tempering in a unique manner to further increase the benefits of the above objects.

BACKGROUND OF THE INVENTION

Anti-friction bearings, commonly of the ball-bearing type, employed in the automotive industry at generally ambient temperature conditions are almost invariable prepared from a steel designated commercially as SAE 52,100. The chemical composition limits for this alloy, typically melted in an electric furnace and then vacuum degassed are: carbon 0.98–1.1%, manganese 0.25–0.45%, 0.025 maximum for each of phosphorous and sulfur, 0.2–0.35% silicon and 1.3–1.6% chromium. This is considered an economical hypereutectoid steel which can be quenched and temperated to provide a hardness generally equal to or greater than $R_c$ 59.

Much research has been carried on by the prior art directed to determining factors which improve bearing life. It would be of considerable importance if this material could be modified to have an increased life against rolling contact fatigue. A 3½ to 4 fold increase or more would be of significant value to the industry.

SUMMARY OF THE DRAWINGS

FIGS. 2–3 are photomicrographs of structure characteristic of the prior art and that of this invention.

DETAILED DESCRIPTION

Figure 1:
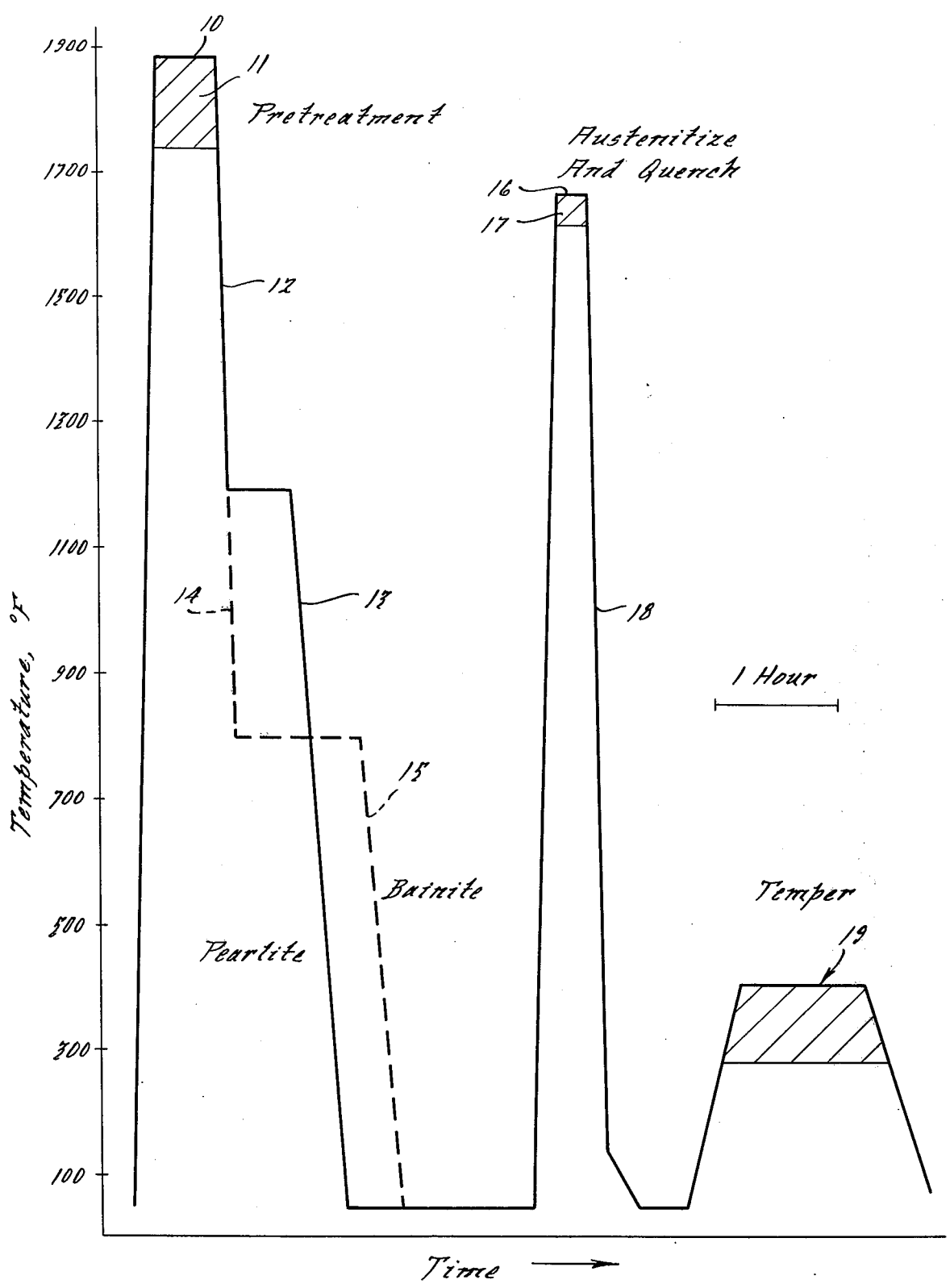
FIG. 1 is a schematic value diagram of the heat treating sequence of this invention.

The prior art method for forming automotive type ball-bearings from SAE 52,100 steel essentially comprises:

1. Shaping a selected steel while hot, such as by hot rolling, to make wire out of which are defined bearing balls or by hot extrusion to make tubing out of which are made bearing races. Useable starting materials, other than 52,100, consists of other low alloy steels, containing 0.6% or more carbon, with sufficient hardenability to allow parts to be fully hardened throughout their cross-section. Adequate hardenability is achieved by use of alloying elements such as Cr, Mn, Ni and Mo.

2. The hot formed shape is spheroidize-annealed to produce a microstructure consisting essentially of ferrite and spheroidal carbides. A variety of thermal cycles are employed. L. E. Heron (Metallurgia, Vol. 80, 1969, pp 53–58) describes cycles employed for En 31 steel, the British equivalent of SAE 52,100. Spheroidize anneal cycles for other alloys are described in Table 3, p. 5, of the Eighth Edition of the Metals Handbook, Vol. 2. The resulting hardness of the microstructure for 52,100 steel with this treatment is normally in the range of 88–94 $R_b$ and typically 90–92 $R_b$. After the heating cycle is completed, the parts are air cooled.

3. The spheroidize-annealed shapes are then rough formed to the desired product shape such as balls or races. Balls are usually upset by cold forming and races are usually defined by machining.

4. The rough-formed parts are hardened by an austenitizing, quenching and tempering treatment. This is accomplished by heating to a temperature of 1500°–1600° F (preferably 1,550° F) for about one hour. At this temperature, austenite of approximately 0.6% carbon is in equilibrium with the undissolved carbides. When the rough formed shapes have become fully austenitized, they are quenched in hot oil (at a temperature of 130°–160° F), and are tempered to a final hardness of $R_c$ 60–64 using a tempering temperature of 250°–400° F.

5. The austenitized parts are then ground to the dimension and surface finish desired in the final part.

This invention teaches that the resistance to rolling contact fatigue can be considerably improved by one or both of the following two variations to the above treatment:

Variation 1: Prior to step (4), provide a pretreatment wherein the material is heated to a temperature level 10 for a period of time to dissolve all or nearly all of the carbides (the temperature is usually 1,750° F or above and preferably at least 1,900° F, the period of time is usually at least 30 minutes as shown by the shaded zone 11 in FIG. 1; subject the heated material to a two stage cooling. As shown in FIG. 1, the first stage 12 consists of rapid cooling to a temperature of about 1,200° F by quenching in molten salt heated to 1,200° F, the parts are held at this temperature for about 15 minutes or longer. The second stage 13 consists of cooling in air to room temperature, or at any other convenient rate. This converts the microstructure of the rough formed shape to fine pearlite with a very thin carbide film at prior austenite grain boundaries. Alternatively, the material can be cooled (as at 14) to about 800° F by quenching in molten salt heated to 800° F and held at this temperature for 1 hour or longer before cooling (as at 15) to room temperature. This treatment produces bainite rather than pearlite. The phase transformations produced by these treatments are described in the literature (C. A. Stickels, Metallurgical Transactions, 1974, Vol. 5, pp. 865–74).

The object of the pretreatment is to produce a microstructure having finely divided and uniformly distributed carbides and having a fine grain size, but achieved without incurring thermal shock. This fine microstructure is important to the achievement of increased rolling contact fatigue life by setting up a fine grain threshold preparatory to the second variation.

Variation 2: Modify step (4) by employing a higher austenitizing temperature 16, preferably in the range of 1625°–1675° F for a period of from 15 seconds to ½ hour (see shaded zone 17) or operationally from 5 seconds to 1 hour, followed by the conventional quenching 18 and tempering 19. Austenitizing temperatures higher than 1,675° F may be employed to provide additional fatigue-life benefit but at the expense of being more sensitive to shorter austenitizing periods. Shorter austenitizing periods dictate the use of induction or molten salt heat treatment rather than furnace heating. The higher austenitizing temperature must be in excess of that temperature required to achieve peak hardness in the steel and preferably about 100° F higher than the temperature required to achieve peak hardness if the hardness curve readily defines a clear concise peak. Peak hardness is used herein to mean the highest hardness obtainable as a function of austenitizing temperature. The beneficial improvement obtainable by using an increased austenitizing temperature can best be fully appreciated and proved by rolling contact fatigue test data. Hardness test data is not determinative. The short duration of this heating step allows electrical induction heating to be employed which is advantageous from productivity and reliability standpoints. Without pretreatment or equivalent processing described in variation 1, variation 2 will not produce an improvement in rolling contact fatigue life (refer to E. Yajima, T. Miyazaki, T. Sugiyama and H. Terajima, Trans. Japan Inst. Metals, 1974, vol. 15, pp. 173–79).

To this end, test data to support the improvements resulting from these two modifications is shown in Tables I and II. To generate such data, a simulative test was employed to evaluate the resistance of steels to rolling contact fatigue. This requires use of a special machine, such as that made by Polymet Corp., Model RCF-1, in which test bars of steel, three-eighths of an inch in diameter, and about 4 inches long, are tested to fatigue destruction. A bar to be tested is chucked tightly in the test machine and driven at a speed of 10,000 rpm while rolling against two rollers (each about 7 inches in diameter) in contact with the bar on opposite sides thereof. The force applied to the bar by the rollers can be adjusted to develop whatever contact stresses are desired. An accelerometer is set to detect any abnormal vibration, such as that caused by spalling due to rolling contact fatigue. The test is ended when a small spall, about 1 millimeter in diameter, forms on the wear path. The number of stress cycles required to obtain failure (which is twice the number of revolutions) is defined as the life of that test specimen.

Using the Polymet test device, a number of steel heat treatments were evaluated. The test procedure consisted of: (1) heat treating bars about 0.390 inches in diameter and about 4 inches long, (2) after heat treatment, providing finish centerless grinding to shape each bar to 0.347 (+0.0000/−0.0006) inches in diameter, and providing a 5–10 microinch AA surface finish using a fixed grinding schedule, and (3) test specimens alternately. Two bars were prepared for each heat treatment to be evaluated; the ends of the bars were designated A1, B1, A2, B2. In alternate testing, one test is run near the A1 end of bars representing each heat treatment, then a second test is run at the A2 ends, a third test at the B1 ends of each, the fourth test at the B2 ends, etc. Thus, the effect of any change in the characteristics of the rollers is spread uniformly among all specimens tested. Because rollers are not precisely uniform, heat treatments are evaluated by batch testing, and life comparisons made only within a batch. If specimens with the same heat treatment are included in different batches, it is possible to normalize results and compare the lives of samples between batches.

For the generation of the following test data, the Polymet machine was loaded with sufficient load on the rollers to produce a nominal Hertzian Contact Stress of 729,000 psi. All test bars were taken from the same lot of commercially produced 52,100 steel. The actual composition of the steel of these test bars was: carbon 1%, manganese 0.3%, sulfur 0.008%, phosphorous 0.015%, silicon 0.26%, chromium 1.37%, and the balance iron.

Table I

A Comparison of the Effect of Pretreatments to Modify Initial Microstructure on the Rolling Contact Fatigue Life of 52100 Steel Austenitized at 1550° F and Tempered at 360° F

| Initial Micro-structure* | No. of Tests | Median B50 Life Cycles | Weibull Slope | Normalized Life |
|---|---|---|---|---|
| A | 16 | 4.02 · 10$^6$ | 2.56 | .67 |
| B | 16 | 6.12 · 10$^6$ | 2.76 | 1.02 |
| C | 16 | 5.98 · 10$^6$ | 1.77 | 1.0 |
| D | 16 | 3.77 · 10$^6$ | 2.56 | .63 |

*A: Spheroidal Carbides in Ferrite produced by spheroidization anneal.
B: Pearlite plus thin grain boundary carbides. Produced from A by heating at 2000° F for 4 hours, salt quenching to 1200° F and holding for 30 minutes, then air cooling.
C: Pearlite plus thin grain boundary carbides. Produced from A by heating at 1900° F for 30 minutes, salt quenching to 1200° F and holding for 30 minutes, then air cooling.
D: Spheroidal carbides in Ferrite. Produced from C by a spheroidization anneal.

Table II

A Comparison of the Effect of Austenitizing and Tempering Temperatures on the Rolling Contact Fatigue Life of 52100 Steel Beginning with a Pearlitic Microstructure (Treatment C of Table I)

| Austenitizing Treatment | Tempering Treatment | No. of Tests | Median B50 Life, cycles | Weibull Slope | Normalized Life |
|---|---|---|---|---|---|
| 1500° F/30 min | 300° F/1 hr | 16 | 7.60 · 10$^6$ | 2.86 | 1.59 |
| 1500° F/30 min | 350° F/1 hr | 16 | 4.13 · 10$^6$ | 3.56 | .86 |
| 1500° F/30 min | 400° F/1 hr | 16 | 3.08 · 10$^6$ | 2.47 | .64 |
| 1550° F/30 min | 350° F/1 hr | 16 | 4.78 · 10$^6$ | 2.67 | 1.00 |
| 1600° F/30 min | 350° F/1 hr | 16 | 5.51 · 10$^6$ | 2.37 | 1.15 |
| 1650° F/30 min | 350° F/1 hr | 16 | 8.04 · 10$^6$ | 2.33 | 1.68 |

The test tabulated in Table I was run to answer three questions: (1) Is fatigue life improved by starting from a pearlitic microstructure rather than from a spheroidal carbide microstructure? (2) Is there an effect on fatigue life derived from varying the method of pretreatment to obtain a pearlitic microstructure? and (3) Is there an effect on fatigue derived from varying the pre-treatment beyond the obvious change in the initial microstructure? The answer to the first question is yes, because treatments 2 and 3 give a better life than the first and fourth treatments. The answer to the second question no, the second and third treatments give essentially the same results. The answer to the third question is also no because the first and fourth treatments give essentially the same results.

The tests in Table II were run to find the optimum austenitizing and tempering temperatures for a pearlitic microstructure. The first three tests of Table II show that fatigue resistance is better when the tempering temperatures are lower. The second and fourth, fifth and sixth tests show that fatigue resistance is better the higher the austenitizing temperature.

It can be concluded from comparing Tables I and II that the average life of a bearing made from 52,100 steel and processed according to this invention, can be increased in life by a factor of 2.5 or greater. This is derived by noting the first test in Table I which represents the life typical of conventionally heat treated bearing materials. Next, by noting the third test in Table I and the fourth test in Table II as being the same heat treatment, neglecting a 10° F difference in tempering temperature. These tests can be used to normalize the test results between the two tables. If this is done, then the average life of the sixth test in Table II is a factor of 2.5 greater than the average life of conventionally heat treated bearing materials.

It is clear also that a further life improvement is probable if a lower tempering temperature is utilized. Where service temperatures of bearings and the surface temperature produced in finish grinding of bearing components can be kept below the tempering temperature, this aditional improvement can be realized so that a factor of 3-4 is realized with respect to an improvement over conventionally processed bearings.

The B50 life, the life at which 50% of the specimens can be expected to have failed, can be reliably determined from a limited number of fatigue tests. The B10 life cannot be established with as high a degree of confidence from the same number of tests. (See L. G. Johnson, "The Statistical Treatment of Fatigue Experiments," Elsevier Publishing Co., New York, 1964). Furthermore, the B10 life is much more sensitive to random accidental factors which produce abnormally short-lived specimens. Scratches on the specimen surface is one such factor. Therefore, the B50 life more reliably characterizes the differences between data from specimens processed in different ways. Thus, differences in B10 life values, in the absence of similar differences in B50 life values, do not necessarily prove or disprove an increase or decrease in fatigue life resulting from a particular processing change.

We claim as our invention:

1. In a method for preparing bearing components wherein a hot-formed shape of low alloy steel containing carbon in the range of 0.6–1.5% and containing alloying ingredients in an amount to achieve a hardening response from heat treatment throughout said shape, said alloying ingredients being selected from the group consisting of Cr, Mn, Ni, Cu and Mo, said shape being subjected sequentially to a spheroidizing-anneal treatment, a rough forming treatment, and a hardening austenitizing treatment, the improvement comprising:
   a. establishing a microstructure having finely divided uniformly distributed carbides, said microstructure having relatively thin carbide films at prior austenite grain boundaries, said microstructure being established just prior to the hardening austenitizing treatment, and
   b. employing an austenitizing temperature for said hardening-austenitizing treatment which is consistently above the austenitizing temperature required to achieve peak hardening for said low alloy steel.

2. The improvement as in claim 1, in which austenitizing of said hardening-austenitizing treatment is carried out at a temperature in the range of 1,625°–1,675° F for a period of time between 5 seconds to 1 hour.

3. The improvement as in claim 1, in which said steel consists essentially of SAE 52,100 steel and said hardening-austenitizing treatment is carried out for a period of time between 15 seconds and ½ hour.

4. The improvement as in claim 1, in which said steel is quenched from said spheroidize-anneal heated condition at a rate to avoid thermal shock but to establish a fine pearlitic microstructure with said finely divided carbides.

5. A method of increasing the fatigue life of hypereutectoid steels having less than about 6% total alloy content and having been previously subjected to a spheroidizing treatment, comprising:
   a. subjecting said steel to a pretreatment consisting of heating to a temperature to form austenite and to dissolve in said austenite substantially all carbides, quenching to above the $M_s$ temperature in a manner to form one or more transformation products of martensite, pearlite and bainite and holding for a sufficient time to obtain a mixture of fine carbides and a fine grained transformation product, and
   b. reheating to austenitize at a temperature in excess of that required to obtain peak hardness in said steel, holding at said austenitizing temperature long enough to assure a desired retained austenite in excess of 18% and short enough to avoid carbide coarsening, quenching said steel to below the $M_s$ temperature.

6. A method as in claim 5 in which said steel is subjected to a temper treatment after said hardening-austenitizing treatment, said tempering temperature being in the range of 290°–400° F.

7. A bearing component consisting essentially of SAE 52,100 characterized by a pearlitic microstructure having thin grain boundary carbides prior to heat treatment for hardening, said bearing component having a resistance to rolling fatigue measured by a simulative test, the value being at least 2.5 times greater than that achieved by conventionally processed 52,100 steel components.

8. The resulting product of claim 6 in which rolling contact fatigue life is increased 3–4 times that of conventionally processed SAE 52,100 steel.

9. The improvement as in claim 1, in which said steel consists essentially of SAE 52,600 steel and said hardening-austenitizing treatment is carried out at temperatures of at least 1,625° F for a period of time between 5 seconds and ½ hour.

* * * * *